US008962504B2

(12) United States Patent
Corral et al.

(10) Patent No.: US 8,962,504 B2
(45) Date of Patent: Feb. 24, 2015

(54) GRAPHENE-REINFORCED CERAMIC COMPOSITES AND USES THEREFOR

(75) Inventors: Erica L. Corral, Tucson, AZ (US); Luke S. Walker, Tucson, AZ (US); Victoria R. Marotto, Tucson, AZ (US); Mohammad A. Rafiee, San Francisco, CA (US); Nikhil Koratkar, Clifton park, NY (US)

(73) Assignee: Arizona Board of Regents on Behalf of The University of Arizona, Tucson, AZ (US)

( * ) Notice: Subject to any disclaimer, the term of this patent is extended or adjusted under 35 U.S.C. 154(b) by 0 days.

(21) Appl. No.: 13/560,463

(22) Filed: Jul. 27, 2012

(65) Prior Publication Data

US 2013/0184143 A1 Jul. 18, 2013

Related U.S. Application Data

(60) Provisional application No. 61/574,206, filed on Jul. 29, 2011.

(51) Int. Cl.
*C04B 35/78* (2006.01)
*C04B 35/584* (2006.01)
(Continued)

(52) U.S. Cl.
CPC ............. *C04B 35/584* (2013.01); *C04B 35/632* (2013.01); *C04B 35/645* (2013.01); *C04B 2235/425* (2013.01); *C04B 2235/5292* (2013.01); *C04B 2235/6562* (2013.01); *C04B 2235/6567* (2013.01); *C04B 2235/666* (2013.01); *C04B 2235/766* (2013.01); *C04B 2235/77* (2013.01);

(Continued)

(58) Field of Classification Search
CPC .... C04B 35/013; C04B 35/103; C04B 35/52; C04B 35/584; C04B 35/587; C04B 35/80; C04B 35/803; C04B 35/806; C04B 2235/422; B82Y 30/00; H01B 1/18
USPC .............. 501/95.2, 97.1, 97.2, 97.3, 97.4, 87, 501/96.3, 90; 252/502, 504, 506, 507, 508, 252/509; 977/778, 785
See application file for complete search history.

(56) References Cited

U.S. PATENT DOCUMENTS 7,566,410 B2 * 7/2009 Song et al. .................... 252/511
7,623,340 B1 * 11/2009 Song et al. .................... 361/502

(Continued)

FOREIGN PATENT DOCUMENTS

| CN | 102332567 | * | 1/2012 |
| CN | 102600775 | * | 7/2012 |
| WO | 2009023051 | * | 2/2009 |

OTHER PUBLICATIONS

Anstis, et al. "A critical evaluation of indentation techniques for measuring fracture toughness: I, direct crack measurements." Journal of the American Ceramic Society 1981, 64, 533-538.

(Continued)

*Primary Examiner* — Karl Group
(74) *Attorney, Agent, or Firm* — McDonnell Boehnen Hulbert & Berghoff LLP (57) ABSTRACT

The disclosure provides novel graphene-reinforced ceramic composites and methods for making such composite materials.

18 Claims, 5 Drawing Sheets

(51) Int. Cl.
  *C04B 35/632* (2006.01)
  *C04B 35/645* (2006.01)
(52) U.S. Cl.
  CPC ......... *C04B 2235/85* (2013.01); *C04B 2235/96* (2013.01); *Y10S 977/778* (2013.01); *Y10S 977/785* (2013.01)
  USPC ............. 501/96.2; 501/87; 501/90; 501/95.2; 501/97.4; 252/502; 252/504; 252/506; 252/507; 252/508; 977/778; 977/785

(56) References Cited

U.S. PATENT DOCUMENTS

| | | | | |
|---|---|---|---|---|
| 7,662,321 | B2* | 2/2010 | Guo et al. | 264/108 |
| 8,257,867 | B2* | 9/2012 | Liu et al. | 429/231.5 |
| 8,450,014 | B2* | 5/2013 | Liu et al. | 429/231.5 |
| 8,557,442 | B2* | 10/2013 | Liu et al. | 429/231.5 |
| 8,574,681 | B2* | 11/2013 | Ruoff et al. | 427/376.2 |
| 2010/0081057 | A1* | 4/2010 | Liu et al. | 429/231.5 |
| 2010/0323178 | A1* | 12/2010 | Ruoff et al. | 428/220 |
| 2011/0051316 | A1* | 3/2011 | Liu et al. | 361/502 |
| 2013/0139446 | A1* | 6/2013 | Malik | 51/309 |

OTHER PUBLICATIONS

Balazsi, et al. "Processing of carbon nanotube reinforced silicon nitride composites by spark plasma sintering." Composites Science and Technology 2005,65, 727-733.
Blanch, et al. "Optimizing Surfactant Concentrations for Dispersion of Single-Walled Carbon N anotubes in Aqueous Solution." The Journal of Physical Chemistry B 2010, 114, 9805-9811.
Balandin, et al. "Superior Thermal Conductivity of Single- Layer Graphene." Nano Letters 2008,8,902-907.
Casolco, et al. "Transparent/translucent polycrystalline nanostructured yttria stabilized zirconia with varying colors." Scripta Materialia 2008, 58, 516-519.
Corral, et al. "Engineered Nanostructures for Multifunctional Single-Walled Carbon Nanotube Reinforced Silicon Nitride Nanocomposites." Journal of the American Ceramic Society 2008,91,3129-3137.
Dresselhaus, et al. "Perspectives on Carbon Nanotubes and Graphene Raman Spectroscopy." Nano Letters 2010, 10, 751-758.
Dusza, et al. "Hot pressed and spark plasma sintered zirconia/carbon nanofiber composites." Journal of the European Ceramic Society 2009, 29,3177-3184.
Estili, et al. "Multiwalled carbon nanotubes as a unique agent to fabricate nanostructure-controlled functionally graded alumina ceramics." Scripta Materialia 2008, 59, 703-705.
Garay, et al. "Current-Activated, Pressure-Assisted Densification of Materials." Annual Reviews Materials Research 2010, 40, 445-468.
Hulberta, et al. "The synthesis and consolidation of hard materials by spark plasma sintering." International Journal of Refractory Metals and Hard Materials 2009, 27,367-375.
Hyuga, et al. "Fabrication and Mechanical Properties of ShN4/Carbon Fiber Composites with Aligned Microstructure Produced by a Seeding and Extrusion Method." Journal of the American Ceramic Society 2004,87,894-899.
Jeong, et al. "Thermal stability of graphite oxide." Chemical physics letters 2009, 470, 255-258.
Khan, et al., "Development of Stiff, Strong, Yet ToughComposites by the Addition of Solvent Exfoliated Graphene to Polyurethane." Carbon 2010,48 [14] 4305-4041.
Lee, et al. "Measurement of the Elastic Properties and Intrinsic Strength of Monolayer Graphene." Science 2008,321,385-388.
Munir, et al. "The effect of electric field and pressure on the synthesis and consolidation of materials: A review of the spark plasma sintering method." Journal of Material Science 2006, 41, 763-777.
Poyato, et al. "Aqueous colloidal processing of single-wall carbon nanotubes and their composites with ceramics." Nanotechnology 2006, 17, 1770-1777.
Rafiee, et al. "Graphene Nano-Ribbon Composites." ACS Nano 2010, 4, 7415-7420.
Rafiee, et al., "Enhanced Mechanical Properties of Nanocomposites at Low Graphene Content." ACS Nano 2009,3, 3884-3890.
Rafiee, et al., "Fracture and Fatigue in Graphene Nanocomposites." Small 2010, 6,179-183.
Ramanathan, et al. "Functionalized Graphene Sheets for Polymer Nanocomposites." Nature Nanotechnology 2008,3,327-331.
Riley, "Silicon Nitride and Related Materials." Journal of the American Ceramic Society 2000, 83,245-265.
Rafiee, et al. "Superhydrophobic to superhydrophilic wetting control in graphene films." Advanced Materials 2010, 22, 2151-2154.
Schniepp, et al. "Functionalized single graphene sheets derived from splitting graphite oxide." Journal of Physical Chemistry B 2006,110,8535-8539.
Sigmund, et al. "Novel powder-processing methods for advanced ceramics." Journal of the American Ceramics Society 2000,83, 1557-1574.
Sun, et al. "Colloidal processing of carbon nanotube/alumina composites."Chemistry of Materials 2002, 14, 5169-5172.
Stankovich, et al. "Graphene-Based Composite Materials." Nature 2006,442,282-286.
Vadukumpully, et al. "Cationic surfactant mediated exfoliation of graphite into graphene flakes." Carbon 2009, 47, 3288-3294.
Vasylkiv, et al. "Nanoreactor engineering and SPS densification of multimetal oxide ceramic nanopowders." Journal of the European Ceramic Society 2009,28,919-927.
Wang, et al. "Graphene Electrodes for DyeSensitized Solar Cells." Nano Letters 2008, 8, 323-327.
Watcharotone, et al. "Graphene-Silica Composite Thin Films as Transparent Conductors." Nano Letters 2007, 7, 1888-1892.
Yu, et al. "Enhanced Thermal Conductivity in a Hybrid Graphite Nanoplatelet-Carbon Nanotube Filler for Epoxy Composites." Advanced Materials 2008, 24, 4740-4744.
Zhan, et al. Single-Wall Carbon Nanotubes as Attractive Toughening Agents in Alumina-based Nanocomposites. Nature Materials 2002, 2 38-42.
Zhang, et al. "Mechanical Properties of Carbon Nanotube-Alumina nanocomposites synthesized by chemical vapor deposition and spark plasma sintering." Composites Part A 2009, 40,86-93.
Zhang, et al. "Processing and characterization ofZrB2-SiCw ultra-high temperature ceramics." Journal of Alloys and Compounds 2009,472, 358-362.
Zhang, et al. "Crack-healing behavior of zirconium diboride composite reinforced with silicon carbide whiskers." Scripta Materialia 2008,59, 1222-1225.
Zhan, et al. "Carbon nanotube reinforced alumina-based ceramics with novel mechanical, electrical, and thermal properties." International Journal of Applied Ceramic Technology 2004, 1, 161-171.

* cited by examiner

GRAPHENE-REINFORCED CERAMIC COMPOSITES AND USES THEREFOR

CROSS-REFERENCE TO RELATED APPLICATIONS

This application claims priority to U.S. Provisional Patent Application Ser. No. 61/574,206 filed Jul. 29, 2011, incorporated by reference herein in its entirety.

STATEMENT OF GOVERNMENT RIGHTS

This work was supported under grant number DMR0954110 and 0900188 from the National Science Foundation, and Award Number: N000140910928 from the US Office of Naval Research. The U.S. government has certain rights in the invention.

DESCRIPTION OF RELATED ART

Structural ceramics are becoming increasingly relevant for high temperature applications. For example, silicon nitride ($Si_3N_4$) is a high temperature resistant ceramic (up to 1500° C.) and is also considered the most reliable structural ceramic due to the formation of an interlocking microstructure of $\alpha$-$Si_3N_4$ that is reinforced with long rod-like $\beta$-$Si_3N_4$ grains. This self-reinforced microstructure results in a high resistance to fracture due to the $\beta$-$Si_3N_4$ grains and high hardness due to the matrix of $\alpha$-$Si_3N_4$ grains. However, $Si_3N_4$ is not widely used due to its overall low toughness properties in comparison to metals.

SUMMARY OF THE INVENTION

In a first aspect, the present invention provides ceramic composite material comprising a graphene-reinforced ceramic material. In one embodiment, the graphene is present in the graphene-reinforced ceramic material at between about 0.02% to about 1.5% on a volume percentage basis. In another embodiment, the graphene is present in the ceramic composite material as two or more graphene sheets. In a further embodiment, the graphene is homogenously dispersed throughout the ceramic composite material. In another embodiment, the graphene comprises graphene or one or more graphene sheets that are present at one or more grain boundaries of the ceramic material. In a further embodiment, the ceramic material comprises $Si_3N_4$. In a still further embodiment, the $Si_3N_4$ is predominately $\alpha$-$Si_3N_4$.

In a second aspect, the present invention provides methods for making a ceramic composite material, comprising
(a) combining graphene with a ceramic material; and
(b) densifying the combination to produce a graphene-reinforced ceramic material.

In one embodiment, the graphene and the ceramic material are each mixed with cationic surfactant prior to the combining step. In another embodiment, the graphene is present in the combination at between 0.5% to 1.5% on a volume percentage basis. In a further embodiment, the cationic surfactant comprises cetyltrimethylammonium bromide (CTAB). In another embodiment, the method comprises
  (a) providing
    (i) a solution of graphene mixed with a cationic surfactant, wherein the solution has a pH of approximately 4; and
    (ii) a solution of ceramic material mixed with a cationic surfactant, wherein the solution has a pH of approximately 4;
  (b) sonicating
    (i) the solution of graphene under conditions suitable to disperse the graphene in the solution to produce a dispersed graphene solution; and
    (ii) the solution of ceramic material under conditions suitable to disperse the ceramic material in the solution to produce a dispersed ceramic material solution;
  (c) combining the dispersed graphene solution and the dispersed ceramic material solution to produce a composite mixture;
  (d) sonicating the composite mixture under conditions suitable to disperse the graphene and the ceramic material in the composite mixture;
  (e) milling the composite mixture;
  (f) evaporating water from the composite mixture to produce a composite slurry;
  (g) heat treating the composite slurry under conditions suitable to remove the cationic surfactant to produce a composite powder; and
  (h) densifying the composite powder to produce the graphene-reinforced ceramic material.

In a still further embodiment, the densifying comprises exposing the composite powder to:
  (i) rapid heating of approximately 100° C./minute up to a maximum temperature of between about 1500° C. and about 1700° C. for between about 2 minutes to about 5 minutes;
  (ii) pressure application of approximately 35 MPa; and
  (iii) electric current with a maximum pulse current of 3000 A and a maximum pulse voltage of 10 Volts.

In another embodiment, the densifying is carried out using spark plasma sintering.

BRIEF DESCRIPTION OF THE DRAWINGS

The results set forth herein, and the properties and characteristics of the composites provided by the disclosure, can be advantageously understood with regard to the drawings.

DETAILED DESCRIPTION OF THE INVENTION

As used herein, the singular forms "a", "an" and "the" include plural referents unless the context clearly dictates otherwise. "And" as used herein is interchangeably used with "or" unless expressly stated otherwise.

All embodiments of any aspect of the invention can be used in combination, unless the context clearly dictates otherwise.

In a first aspect, the present invention provides novel ceramic composite materials comprising a graphene-reinforced ceramic material. As exemplified below, the inventors have discovered that graphene-ceramic composites exhibit significantly enhanced toughness of starting ceramic materials, and thus broadening their use in materials and processes that require high temperatures (>1000° C.). Exemplary methods for making the graphene-reinforced ceramic materials are described below.

Graphene is an allotrope of carbon, with a structure of one-atom-thick planar sheets of $sp^2$-bonded carbon atoms that are densely packed in a honeycomb crystal lattice. Graphene can be prepared by any suitable technique, including but not limited to the techniques described in the examples that follow, or may be purchased from commercial suppliers, including but not limited to Graphene Industries (Manchester, UK). In one embodiment, the graphene is provided in the form of graphene platelets (GPL), which can be obtained from a number of commercial sources. Alternatively, the GPLs can be prepared by any suitable technique, such as those described below. As used herein, "GPLs" are stacks of 2 or more (2, 3, 4, 5, 6, or more) graphene sheets with nanoscale thickness (averaging less than 2 nm thickness). GPLs are also commonly referred to a multilayer graphene sheets.

Any suitable ceramic material may be part of the graphene-reinforced ceramic material, including but not limited to boride-, carbide-, nitride-, oxide-based ceramics, $Si_3N_4$, $ZrB_2$, $HfB_2$, $TaB_2$, $TiB_2$, $NbB_2$, TiC, ZrC, NbC, HfC, TaC, and oxide compounds including but not limited to, $Al_2O_3$, and $ZrO_2$, each of which may further form ceramic composites with, for example, SiC, $B_4C$, $TaB_2$, or $TaSi_2$. In one embodiment, the ceramic material comprises or consists of $Si_3N_4$.

The graphene is present in the graphene-reinforced ceramic material at between about 0.02% to about 1.5% on a volume percentage basis (total solids basis). In a further embodiment, the graphene is present in the graphene-reinforced ceramic material at between about 0.5% to about 1.5% on a volume percentage basis. Thus, in various embodiments, the graphene is present in the graphene-reinforced ceramic material at between about 0.02% to about 1.5%; 0.05% to about 1.5%; 0.1% to about 1.5%; 0.2% to about 1.5%; 0.3% to about 1.5%; 0.4% to about 1.5%; 0.5% to about 1.5%; about 0.5% to about 1.4%; about 0.5% to about 1.3%; about 0.5% to about 1.2%; about 0.5% to about 1.1%; about 0.5% to about 1.0%; about 0.5% to about 0.9%; about 0.5% to about 0.8% about 0.5% to about 0.7%; about 0.6% to about 1.5%; about 0.7% to about 1.5%; about 0.8% to about 1.5%; about 0.9% to about 1.5%; about 1.0% to about 1.5%; about 1.1% to about 1.5%; about 1.2% to about 1.5%; or about 1.3% to about 1.5%; on a volume percentage basis.

In one embodiment, the graphene is homogenously dispersed throughout the ceramic composite material. In one embodiment, the graphene or graphene sheets are homogenously dispersed throughout the composite within the grain boundaries of the ceramic matrix. In another embodiment, the graphene is present in the ceramic composite material as one or more (1, 2, 3, 4, 5, etc.) graphene sheets or GPLs. As discussed below, graphene sheets/GPLs help to improve toughness of composites containing them.

In another embodiment, at least a portion of the graphene in the composite is present at one or more grain boundaries of the ceramic material. While not being bound by any specific mechanism, the inventors believe that graphene present within grain boundaries helps to prevent cracks in the composite materials from changing their propagation paths in two-dimensional space and forces cracks to propagate in three-dimensional space, thus greatly strengthening the composite. Such an unexpected fracture resistance mechanism has not previously been reported in ceramic matrix composites. In one embodiment, the graphene present at one or more grain boundaries of the ceramic material comprises one or more graphene sheets or GPLs. Based on the examples that follow, it is expected that the graphene sheet(s) or GPL wrap around the matrix grain boundaries, increasing contact area with the matrix and further increasing toughness of the composite.

In one embodiment, the ceramic material comprises or consists of $Si_3N_4$. In a further embodiment, the $Si_3N_4$ in the graphene-reinforced material consists predominately (i.e., >99%) $\alpha$-$Si_3N_4$ grains. In another embodiment, the $Si_3N_4$ in the graphene-reinforced material consists solely $\alpha$-$Si_3N_4$ grains.

It will further be understood by those of skill in the art that the graphene-reinforced ceramic material may be of any size or geometry suitable for a given use and which can be accommodated by appropriate methods for preparing the materials, such as those disclosed herein. In one embodiment, the composite material is a nanocomposite material. The density of the graphene-reinforced ceramic material may be of any suitable density. In one embodiment, the density is between about 3.175 g/cm³ and about 3.223 g/cm³. The hardness of the graphene-reinforced ceramic material may be of any suitable hardness. In one embodiment, the hardness is between about 18.6 GPa and about 30.7 GPa. The toughness of the graphene-reinforced ceramic material may be of any suitable toughness. In one embodiment, the toughness is between about 2.56 MPa$^{-m10}$ and about 7.91 MPa$^{-m10}$.

The graphene-reinforced ceramic material may be used in any structure for which they are suitable. In various embodiments, the graphene-reinforced ceramic material may be incorporated into any structure suitable for use in, for example, aerospace vehicle applications, medical device applications, structural and building applications, electronics applications, and energy application.

In a second aspect, the present invention provides methods for making a ceramic composite material, comprising
(a) combining graphene with a ceramic material; and
(b) densifying the combination to produce a graphene-reinforced ceramic material.

This aspect of the invention can be used, for example, to prepare the graphene-reinforced ceramic materials described herein. The methods are shown in the examples that follow to produce graphene-ceramic composites exhibiting significantly enhanced toughness compared to starting ceramic materials, and thus broaden their use in materials and processes that require high temperatures (>1000° C.).

The graphene can be prepared by any suitable technique, including but not limited to the technique described in the examples that follow, or may be purchased from commercial suppliers, including but not limited to Graphene Industries (Manchester, UK). In one embodiment, the graphene is provided in the form of graphene platelets (GPL), which can be obtained from a number of commercial sources. Alternatively, the GPLs can be prepared by any suitable technique, such as those described below. As used herein, "GPLs" are stacks of 2 or more (2, 3, 4, 5, 6, or more) graphene sheets with nanoscale thickness (averaging less than 2 nm thickness).

The methods can be used to toughen any suitable ceramic material. Any suitable ceramic material may be used, including but not limited to boride-, carbide-, nitride-, oxide-based ceramics, $Si_3N_4$, $ZrB_2$, $HfB_2$, $TaB_2$, $TiB_2$, $NbB_2$, $TiC$, $ZrC$, $NbC$, $HfC$, $TaC$, and oxide compounds including but not limited to, $Al_2O_3$, and $ZrO_2$, each of which may further form ceramic composites with, for example, SiC, $B_4C$, $TaB_2$, or $TaSi_2$. In another embodiment, the ceramic material comprises or consists of $Si_3N_4$. In a further embodiment, the $Si_3N_4$ consists predominately (i.e., >99%) $\alpha$-$Si_3N_4$ grains. In another embodiment, the $Si_3N_4$ consists solely $\alpha$-$Si_3N_4$ grains.

In one embodiment, the graphene and the ceramic material are each mixed with cationic surfactant prior to the combining step. This step helps to produce highly dispersed graphene and ceramic material slurries, by creating a positive electrostatic repulsive force between the two phases of the composite materials and with each other. This electrostatic repulsion develops due to the net charge from the positive head group on the surfactant molecules on the graphene and the ceramic material. Any suitable cationic surfactant can be used, including but not limited to cetyltrimethylammonium bromide (CTAB). The amount of surfactant used is generally based on its dry weight and is generally used at a concentration above the critical micelle concentration. In a non-limiting embodiment, approximately 1% wt:wt of CTAB is mixed with the graphene platelets and with the ceramic material.

The amount of graphene combined with the ceramic material is between about 0.02% to about 1.5% graphene:ceramic material on a volume percentage basis (total solids basis). In a further embodiment, the amount of graphene combined with the ceramic material is between about 0.5% to about 1.5% graphene:ceramic material on a volume percentage basis. Thus, in various embodiments, the amount of graphene combined with the ceramic material is between about 0.02% to about 1.5%; 0.05% to about 1.5%; 0.1% to about 1.5%; 0.2% to about 1.5%; 0.3% to about 1.5%; 0.4% to about 1.5%; 0.5% to about 1.5%; about 0.5% to about 1.4%; about 0.5% to about 1.3%; about 0.5% to about 1.2%; about 0.5% to about 1.1%; about 0.5% to about 1.0%; about 0.5% to about 0.9%; about 0.5% to about 0.8% about 0.5% to about 0.7%; about 0.6% to about 1.5%; about 0.7% to about 1.5%; about 0.8% to about 1.5%; about 0.9% to about 1.5%; about 1.0% to about 1.5%; about 1.1% to about 1.5%; about 1.2% to about 1.5%; and about 1.3% to about 1.5%; on a volume percentage basis.

In a non-limiting embodiment, the method comprises:
(a) providing:
(i) a solution of graphene mixed with a cationic surfactant (such as CTAB), wherein the solution has a pH of approximately 4; and
(ii) a solution of ceramic material mixed with cationic surfactant (such as CTAB), wherein the solution has a pH of approximately 4;

(b) sonicating:
(i) the solution of graphene under conditions suitable to disperse the graphene in the solution to produce a dispersed graphene solution; and
(ii) the solution of ceramic material under conditions suitable to disperse the ceramic material in the solution to produce a dispersed ceramic material solution;

(c) combining the dispersed graphene solution and the dispersed ceramic material solution to produce a composite mixture;

(d) sonicating the composite mixture under conditions suitable to disperse the graphene and the ceramic material in the composite mixture;

(e) milling the composite mixture;

(f) evaporating water from the composite mixture to produce a composite slurry;

(g) heat treating the composite slurry under conditions suitable to remove the cationic surfactant to produce a composite powder; and (h) densifying the composite powder to produce the graphene-reinforced ceramic material.

Based on the teachings herein, it is well within the level of those of skill in the art to determine appropriate conditions for mixing, sonicating, combining, milling, evaporating, heat treating, and densifying. Exemplary such conditions are provided in the examples that follow.

In one embodiment, the densifying comprises exposing the composite powder to:
(i) rapid heating of approximately 100° C./minute up to a maximum temperature of between about 1500° C. and about 1700° C. for between about 2 minutes and about 5 minutes;
(ii) pressure application of approximately 35 MPa; and
(iii) electric current with a maximum pulse current of 3000 A and a maximum pulse voltage of 10 Volts.

The maximum temperature is between about 1500° C. and about 1700° C.; in various embodiments, the maximum temperature may be between about 1600° C. and about 1700° C.; between about 1650° C. and about 1700° C.; between about 1500° C. and about 1650° C.; between about 1500° C. and about 1600° C.; and between about 1600° C. and about 1650° C.

In one embodiment, this densifying is carried out using spark plasma sintering (SPS). The advantages of using SPS to densify ceramics include: (1) rapid heating rates (up to 600° C./min); and (2) simultaneous applied pressure (60-120 MPa). SPS simultaneously applies pressure and quickly pulses electric current through a graphite die containing the ceramic powders that are to be densified. The pulsed current assists in densification upon applied pressure and relies on creep and related mechanisms for densification and not the conventional sintering methods that involve diffusion and mass transport of material across the grain boundaries during long periods of time at elevated temperatures. Exemplary and non-limiting specific SPS conditions are provided in the examples that follow.

Those having skill in the art will recognize that the starting materials and method conditions/parameters may be varied, the sequence of the method steps altered, and additional steps employed to produce composites encompassed by the present disclosure, as demonstrated by the following examples. Starting materials can be obtained from commercial sources or prepared by well-established literature methods known to those of ordinary skill in the art. This will sometimes require a judgment to modify the order of the method steps or to select one particular process scheme over another in order to obtain a desired composite of the disclosure.

The preparation of the composite materials of the disclosure is illustrated further by the following examples, which are not to be construed as limiting the disclosure in scope or spirit to the specific procedures and composites described in them.

EXAMPLES

Summary

The majority of work in graphene nanocomposites has focused on polymer matrices. Here we report for the first time the use of graphene to enhance the toughness of bulk silicon nitride ceramics. Ceramics are ideally suited for high temperature applications but suffer from poor toughness. Our approach uses graphene platelets (GPL) that are homogeneously dispersed with silicon nitride particles and densified, at ~1650° C., using spark plasma sintering. The sintering parameters are selected to enable the GPL to survive the harsh processing environment, as confirmed by Raman spectroscopy. We find that the ceramic's fracture toughness increases by up to ~235% (from ~2.8 to ~6.6 MPa-m$^{1/2}$) at ~1.5% GPL volume fraction. Most interestingly novel toughening mechanisms were observed that show GPL wrapping and anchoring themselves around individual ceramic grains to resist sheet-pullout. The resulting cage-like graphene structures that encapsulate the individual grains were observed to deflect propagating cracks in not just two- but three-dimensions.

Structural ceramics are becoming increasingly relevant for high temperature applications.[12] In particular, silicon nitride ($Si_3N_4$) is a high temperature resistant ceramic (up to 1500° C.), and is also considered the most reliable structural ceramic due to the formation of an interlocking microstructure of $\alpha$-$Si_3N_4$ that is reinforced with long rod-like $\beta$-$Si_3N_4$ grains'[2]. This self-reinforced microstructure results in a high resistance to fracture due to the $\beta$-$Si_3N_4$ grains and high hardness due to the matrix of $\alpha$-$Si_3N_4$ grains.[12] The combination of high hardness and toughness in one material composition and the ability to tailor each property based on the microstructure is the principal reason why $Si_3N_4$ is considered the leading structural ceramic. However, $Si_3N_4$ is still not widely used in many elevated temperature (>1000° C.) applications due to its overall low toughness properties in comparison to metals.

Conventional ceramic matrix composites (CMCs) use one-dimensional fibers as the reinforcement phase such as, carbon fibers[13] or carbon nanotubes,[14-15] and ceramic whiskers.[16-17] To the best of our knowledge there are currently no reports showing CMCs processed with graphene reinforcement for mechanical properties enhancement. A major reason why processing graphene reinforced bulk ceramic composites has been limited is the thermal stability limitations of graphene at high temperature. Ceramics, start to densify and sinter at temperatures >1000° C., and $Si_3N_4$ is usually sintered at, ~1800° C., therefore, making it challenging to incorporate graphene which has low thermal stability at temperatures in excess of ~600° C.[18] In order to determine the true effect of graphene on the toughness of $Si_3N_4$, and to eliminate the effect of the $\beta$-$Si_3N_4$ grains on toughening, we chose to control the matrix microstructure to be approximately 100% $\alpha$-$Si_3N_4$ (equiax grains). We did so using spark plasma sintering (SPS), which is a process that reduces the time at temperature from hours to minutes over conventional sintering methods, thus allowing accurate control of the $\alpha$- to $\beta$-$Si_3N_4$ conversion, and also limits thermally induced structural damage to the graphene platelets (GPL) by avoiding long processing times at high temperature.

Results

Figure 1:
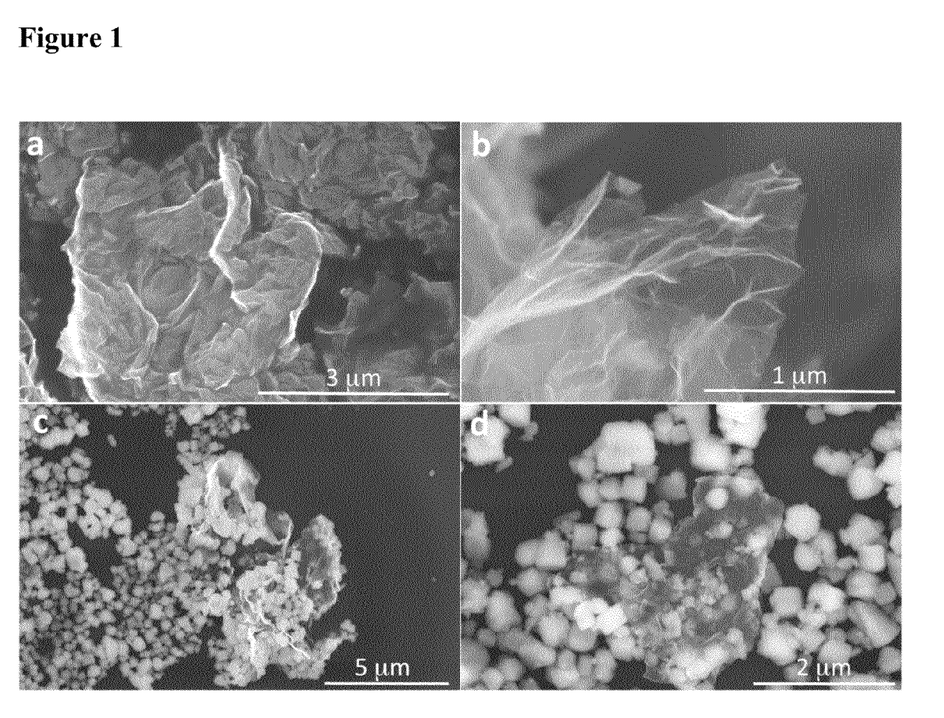
FIG. 1: (a) Low and (b) high resolution SEM images of as-produced GPL and GPL-$Si_3N_4$ graphene platelets showing tightly packed platelets containing crumpled sheets of graphene. (c) Low and (d) high-resolution SEM images after colloidal processing indicating partially exfoliated GPL mixed with well-dispersed $Si_3N_4$ particles.

In order to obtain uniform, densified, microstructures of our nanocomposites we used colloidal processing methods to create homogenously dispersed particle systems in aqueous suspension.[19-22] Highly dispersed GPL/$Si_3N_4$ nanocomposite slurries, using 0.02, 0.5, 1.0 and 1.5-vol % graphene (total solids basis) were processed using methods based on our previous work with single-walled carbon nanotube (SWNT)-$Si_3N_4$ ceramic nano-composites.[23] Bulk quantities of GPL used in this study were produced by the rapid thermal expansion (>2000° C. min$^{-1}$) of graphite oxide.[24-25] The platelets were comprised on average of ~3-4 graphene sheets with less than 2 nm thickness.[25] Elemental analysis gave the carbon to oxygen ratio in GPL as ~9.1 to 1, which confirmed that the majority of oxygen containing moieties were expelled due to the thermal shock. FIG. 1a-b show typical scanning electron microscopy (SEM) images of the as-produced GPL. The GPL are agglomerated, as seen in FIG. 1a, before the colloidal processing step. In FIG. 1b, the higher resolution SEM image shows the wrinkled surface of a few partially separated graphene sheets.

We have previously shown that the dispersion of SWNTs using a cationic surfactant, cetyltrimethylammonium bromide ($C_{16}$TAB) occurs because the hydrophobic SWNTs are attracted to the hydrophobic tails of the surfactant, resulting in SWNTs that are covered in positively charged surfactant molecules.[23,26] We used CTAB as the dispersant throughout this study to disperse GPLs, assuming similar carbon surface chemistry as the SWNTs. The amount of surfactant used was based on its dry weight and was used at a concentration above the critical micelle concentration. We used 1.0 wt % CTAB to GPLs and 1.0 wt % CTAB to $Si_3N_4$ powders in order to create a positive electrostatic repulsive force between the two phases of the composite materials and with each other. This electrostatic repulsion was developed due to the net charge from the positive head group on the surfactant molecules on the graphene platelets and the $Si_3N_4$ particles. FIG. 1c and FIG. 1d show SEM images of the GPL and $Si_3N_4$ powder mixtures after aqueous colloidal processing. FIG. 1c shows GPL separated from each other amongst a uniform dispersion of $Si_3N_4$ particles. FIG. 1d shows a higher resolution image of a GPL decorated with individual $Si_3N_4$ particles, which are also enveloped within the GPL.

SPS is a relatively new high temperature powder consolidation method that has already been used to successfully create fully-dense ceramics,[27-29] nanoceramics,[30-31] and ceramic nanocomposites reinforced with carbon nanotubes.[23, 32-35] The advantages of using SPS to densify ceramics are: (1) rapid heating rates (up to 600° C./min); and (2) simultaneous applied pressure (60-120 MPa). SPS simultaneously applies pressure and quickly pulses electric current through a graphite die containing the ceramic powders that are to be densified. The pulsed current assists in densification upon applied pressure and relies on creep and related mechanisms for densification and not the conventional sintering methods that involve diffusion and mass transport of material across the grain boundaries during long periods of time at elevated temperatures.[28] For this study, we used SPS to densify our nanocomposite powders with precise control of the matrix micro-structure, and to limit the time at temperature to minimize the possibility of structural damage to the GPL at high temperatures and pressures. The protocols used for SPS operation, and nancomposite and graphene preparation are provided in the Materials and Methods Section.

Table 1 shows the SPS heating rate, time at temperature, hold time, percent theoretical density (% TD) and final material composition obtained for monolithic $Si_3N_4$.

TABLE 1

Physical properties of $Si_3N_4$ monoliths densified using SPS.

| Starting Material Composition | SPS Heating Rate (° C./min) | Sintering Temperature (° C.) | Hold Time (min.) | Applied Load (MPa) | % Theoretical Density | Final Material Composition |
|---|---|---|---|---|---|---|
| α-$Si_3N_4$ | 100 | 1500 | 5 | 35 | 87.6 | 100% α-$Si_3N_4$ |
| α-$Si_3N_4$ | 100 | 1575 | 5 | 35 | 98.4 | 100% α-$Si_3N_4$ |
| α-$Si_3N_4$ | 100 | 1600 | 5 | 35 | 99.5 | 100% α-$Si_3N_4$ |
| α-$Si_3N_4$ | 100 | 1700 | 5 | 35 | 99.0 | 83% α-$Si_3N_4$ |
| α-$Si_3N_4$ | 100 | 1600 | 2 | 35 | 93.8 | >99% α-$Si_3N_4$ |
| α-$Si_3N_4$ | 100 | 1625 | 2 | 35 | 97.0 | >99% α-$Si_3N_4$ |
| α-$Si_3N_4$ | 100 | 1650 | 2 | 35 | 100.0 | >99% α-$Si_3N_4$ |

Figure 2:
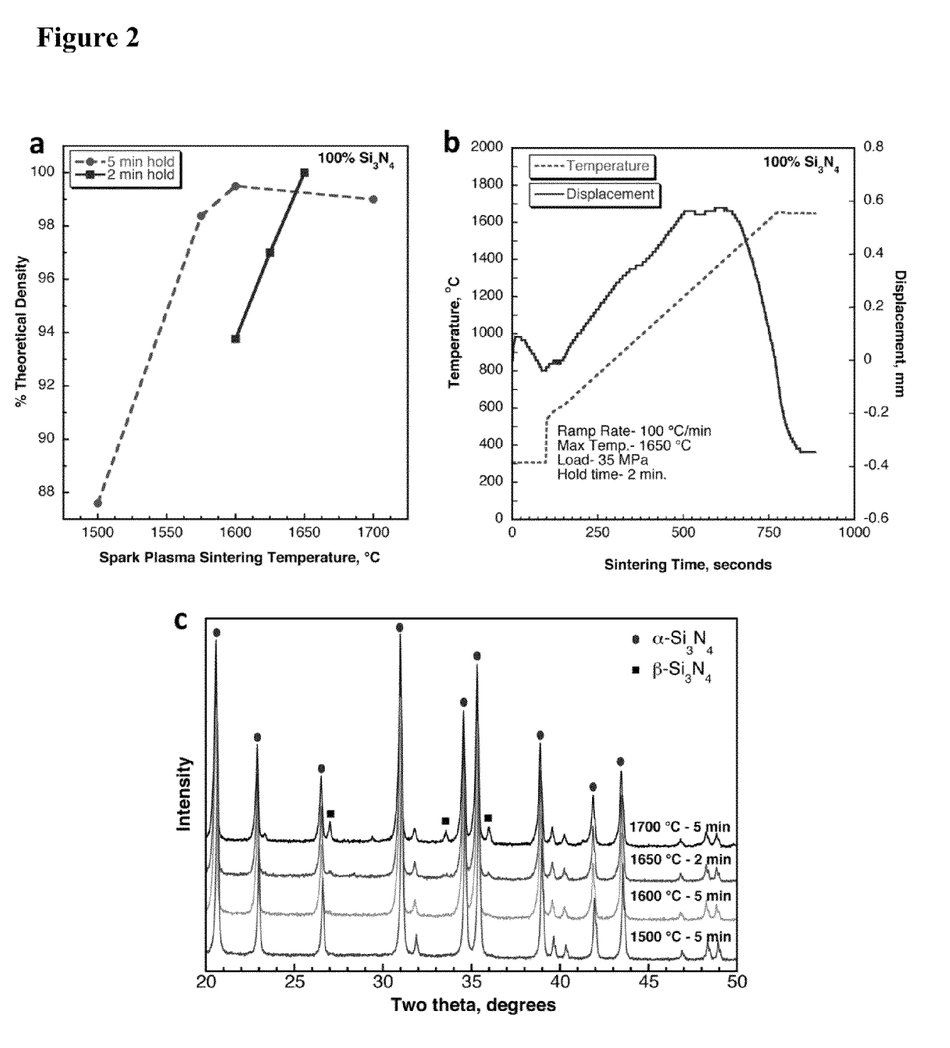
FIG. 2: (a) The density of spark plasma sintered $Si_3N_4$ matrix material is plotted as a function of sintering temperature for two different times at temperature which are 5-minute hold and 2-minute hold at temperature. (b) The densification profile for this high density part shows a steady increase in displacement with increasing temperature up to the final sintering temperature; (c) The X-Ray diffraction phase analysis of the matrix after SPS shows that for the highest density part (1650° C.) we retain a phase composition that is approximately 100% $\alpha$-$Si_3N_4$.

The goal of this preliminary densification investigation was to determine the SPS parameters that would result in creating nearly 100% α-$Si_3N_4$ while maintaining high density at the lowest possible temperature and shortest amount of time at temperature. FIG. 2a shows the density plot for monolithic $Si_3N_4$ sintered from, 1500 to 1700° C., using two different hold times of two- and five-minutes at temperature. The 5-minute density plot shows that the density increases with increasing temperature from, 1500 to 1600° C. (99.5% TD), and then remains relatively constant up to, 1700° C. (99.0% TD). The two-minute density plot shows that the effect of temperature on densification is significantly greater when using a shorter hold time (keeping the heating rate constant) and results in 100% TD at 1650° C. FIG. 2b shows the shrinkage displacement curve and the heating profile curve that was measured during the SPS run for the high density monolithic part sintered at, 1650° C. for 2-minutes. The displacement curve shows steady shrinkage displacement with increasing temperature up to ~1650° C., which represents ideal densification behavior. FIG. 2c shows the X-Ray diffraction (X'Pert MPD Pro, PANalytical, Westborough, Mass., USA) (Cu Kα) patterns for the monoliths sintered at various temperatures and hold times. Specifically, the XRD spectrum for the monolith sintered at 1650° C., for only 2-minutes, confirms that SPS can be used to tailor the matrix microstructure to ~100% α-$Si_3N_4$, while achieving high density. The accurate and reliable control of the matrix microstructure (α-$Si_3N_4$) is important because we want to evaluate the effect of GPL as structural reinforcement within a uniform and homogenous equiax grain matrix microstructure. The XRD spectrum for the monoliths sintered at, 1500, 1600, and 1700° C., for five minutes at temperature are also shown in FIG. 2c with the percentage of each phase listed in Table 1. As expected, the phase content transitions from, 100% α-$Si_3N_4$ to β-$Si_3N_4$ formation with increasing sintering temperature.

Figure 3:
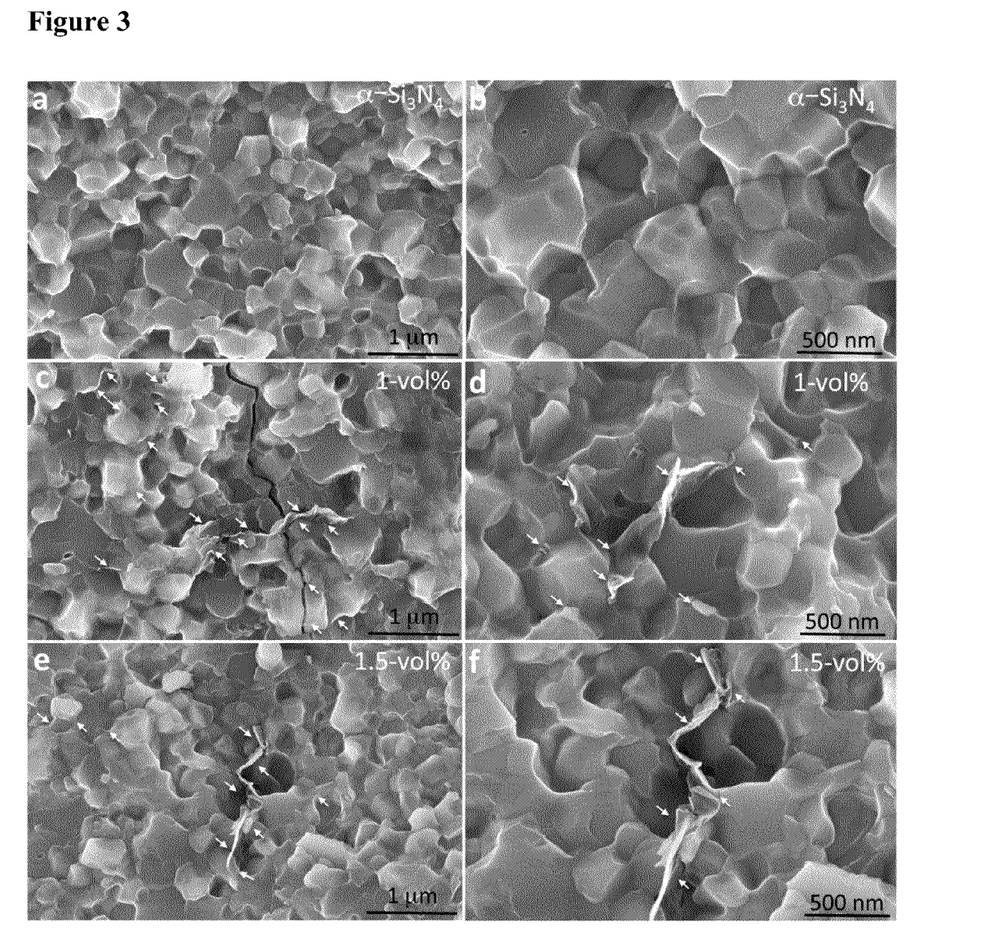
FIG. 3: (a) Low and (b) higher magnification SEM images of the high-density, 100% $\alpha$-$Si_3N_4$, monolithic ceramic matrix material showing an equiaxed and homogeneous grain microstructure. (c) Low and (d) higher magnification SEM images of the sintered and fractured, 1.0-vol % GPL-$Si_3N_4$ nanocomposite. Corresponding (e) Low and (f) high magnification SEM images of the 1.5-vol % GPL-$Si_3N_4$ nanocomposite.

FIG. 3a and FIG. 3b are SEM images of two different fracture surfaces for the same specimen of ~100% α-$Si_3N_4$ (>99% T.D.). The grain size is estimated as ~500 nm and the grains are uniform throughout the fracture surfaces. FIG. 3c and FIG. 3d are SEM images of two different fracture surfaces for the same 1.0-vol % GPL-$Si_3N_4$ nanocomposite. FIG. 3c is the lower resolution image showing the α-$Si_3N_4$ grain matrix microstructure. It also indicates homogeneous dispersion of the GPL throughout the nanocomposite (as pointed out by the small white arrows directly labeled on the image). This specific image (FIG. 3c) was taken at this area because of the interesting interactions between the large crack that runs through the bulk of the specimen and the GPL at the center of the image. First, we notice that the GPL is protruding out of the fracture surface and it is a large platelet that runs along the grain boundaries of the matrix. The long continuous platelet of graphene does not appear to deflect the crack propagation path in-plane. However, the crack does not penetrate or puncture through the graphene platelet either. Therefore, we believe that the crack is arrested at the GPL and has to change directions (i.e. undergo out-of-plane deflection) to negotiate the GPL. Thus it appears that the GPL (which are anchored at the grain boundaries) prevent cracks from changing their propagation paths in the conventional two-dimensional spaces and forces such cracks to propagate in three-dimensional space. Such a fracture resistance mechanism has hitherto not been reported in conventional CMC systems. FIG. 3d is an SEM image of a fracture surface at a different location of the same nanocomposite (1.0-vol % GPL-$Si_3N_4$) and shows how the GPL (at the center of the image) is anchored securely within the grain boundaries of the matrix microstructure. The image also depicts smaller GPL dispersed throughout the microstructure of the nanocomposite (pointed out by the small white arrows directly labeled onto the image). In comparison with the monolith (FIG. 3b) the nanocomposite microstructure is less angular and appears to exhibit less of a brittle fracture microstructure.

FIG. 3e and FIG. 3f are SEM images of the same fracture surface for the 1.5-vol % GPL-$Si_3N_4$ nanocomposite. The bulk fracture surface is similar to the 1.0-vol % GPL-$Si_3N_4$ nanocomposite. At lower magnification (FIG. 3e) one can clearly see the graphene sheets pulled out of the fracture surface and in other regions they create a single layer (or possible few layers) veil of graphene that drapes over the fracture surface (top left corner) which makes them difficult to distinguish at first glance. The higher resolution SEM image in FIG. 3f illustrates a wall of graphene sheets that follows the grain boundaries of the matrix. Conventional fiber-reinforced ceramic toughening mechanisms such as, fiber pull-out, are commonly observed on fracture surfaces of bulk CMCs. For our system also we do observe the pull-out of the graphene sheets that are tucked and wrapped around the matrix grains. We expect that the energy required to pull out a sheet is greater than that of a fiber due to "sheet-wrapping" around the matrix grain boundaries and the increased contact area with the matrix.

In order to qualitatively quantify the effect of graphene concentration on the toughness of the ceramic, we used microhardness testing to induce radial cracking from the corners of the indentation. These cracks are then measured in length in order to calculate a toughness value using the Antis equation[36] (Equation 1). This equation uses the measured, hardness (H), applied load (P), modulus (E=300 GPa, as measured previously for $Si_3N_4$), crack length ($c_o$), and a constant for Vickers produced radial cracks in brittle ceramics (0.16) in order to calculate a toughness value.

summarizes the density, theoretical density, hardness, and toughness values for each nanocomposite (0.02-, 0.2-, 1.0-, and 1.5-vol % GPL-$Si_3N_4$) and the monolith that were all sintered at ~1650° C. (for 2-minutes).

TABLE 2

Physical and mechanical properties of graphene-$Si_3N_4$ nanocomposites.

| Starting Material Composition | Density (g/cm³) | % Theoretical Density | Hardness (GPa) | Toughness (MPa-m$^{1/2}$) |
|---|---|---|---|---|
| 0.00 vol % Graphene + 100.00 vol % $Si_3N_4$ | 3.223 | 100.0 | 22.3 ± 0.84 | 2.8 ± 0.12 |
| 0.02 vol % Graphene + 99.98 vol % $Si_3N_4$ | 3.204 | 99.5 | 21.2 ± 0.34 | 2.7 ± 0.14 |
| 0.50 vol % Graphene + 99.50 vol % $Si_3N_4$ | 3.198 | 99.7 | 19.3 ± 0.69 | 5.21 ± 1.00 |
| 1.00 vol % Graphene + 99.00 vol % $Si_3N_4$ | 3.175 | 99.3 | 20.4 ± 0.37 | 5.8 ± 1.18 |
| 1.50 vol % Graphene + 98.50 vol % $Si_3N_4$ | 3.175 | 99.6 | 15.7 ± 0.61 | 6.6 ± 1.31 |

$$K_C = 0.16 \left(\frac{E}{H}\right)^{1/2} \left(\frac{P}{c_o^{3/2}}\right) \quad (1)$$

The Vickers hardness number (H) used to calculate the toughness values was measured using an applied load of 9.8 N in order to avoid forming radial cracks. An applied load of, 98 N, was used to create reproducible radial cracks that were used to measure crack values ($c_o$) used in Eq. (1).

Figure 4:
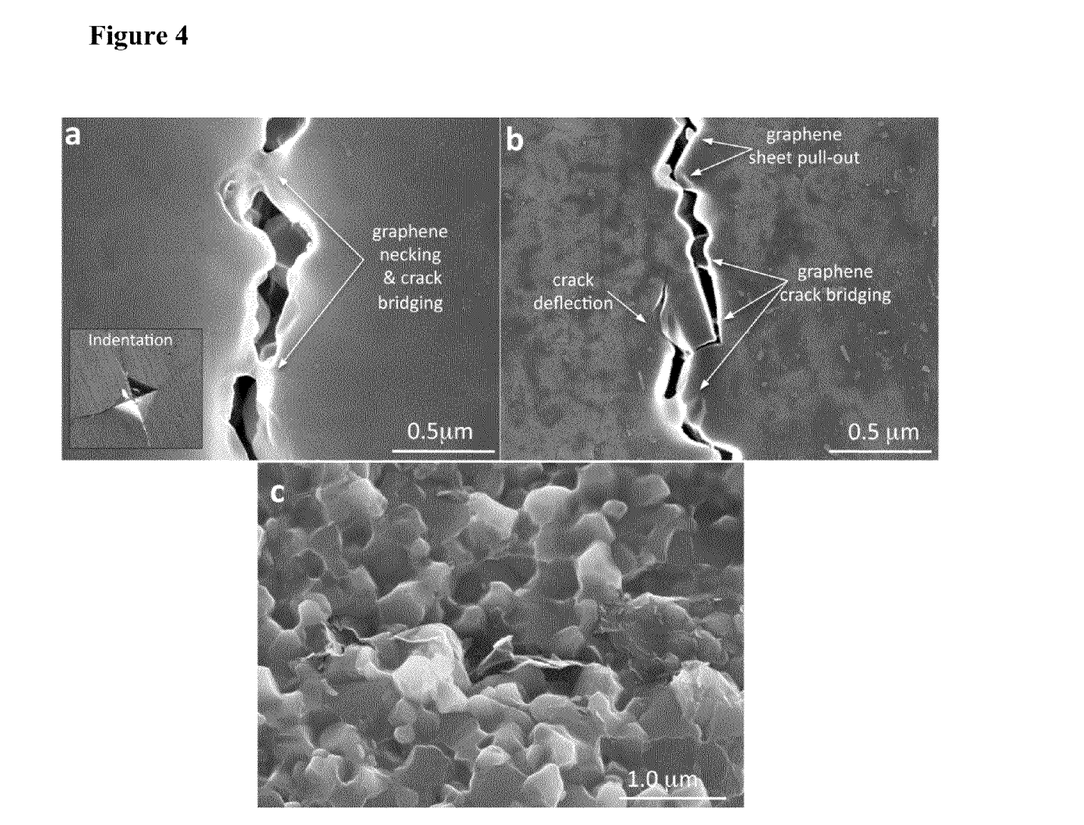
FIG. 4: (a) Microhardness testing resulting in the creation of radial cracks stemming from the microhardness indent (inset image) in GPL-$Si_3N_4$ nanocomposites. (b) Further examination of the radial cracks indicates that they follow a tortuous crack propagation path. (c) Fracture surface of the bulk sample indicates the presence of three-dimensional toughening mechanisms for the GPL-Si₃N₄ nanocomposite.

FIG. 4a shows a representative microhardness indentation (inset image) of the 1.0-vol % GPL-$Si_3N_4$ nanocomposite. The area of the indent is approximately 150 μm² and was created using a 196 N applied load. FIGS. 4a and 4b are high-resolution images of the microhardness induced radial cracks. FIG. 4a shows crack deflection resulting in a branched crack structure. Probing within the cracks (FIGS. 4a and 4b) one can see direct evidence of "sheet pull-out" and graphene sheets that are bridging the cracks, which are directly labeled on the images. FIG. 4a also shows two regions within the crack where it appears that the GPLs are necking down to a smaller cross-sectional area within the crack wake. FIG. 4c, shows the bulk fracture surface for the 1.0-vol % GPL-$Si_3N_4$ nanocomposite. The GPL at the center of the image is protruding out of the surface and follows the contours formed by the matrix grain boundaries. This fracture surface again illustrates the ability of the GPL to block the in-plane propagation of the crack thereby forcing it to climb over the wall of graphene sheets. Such a fracture surface is unexpected for a ceramic and suggests that the two-dimensional GPL promotes the deflection of cracks in three-dimensions.

Figure 5:
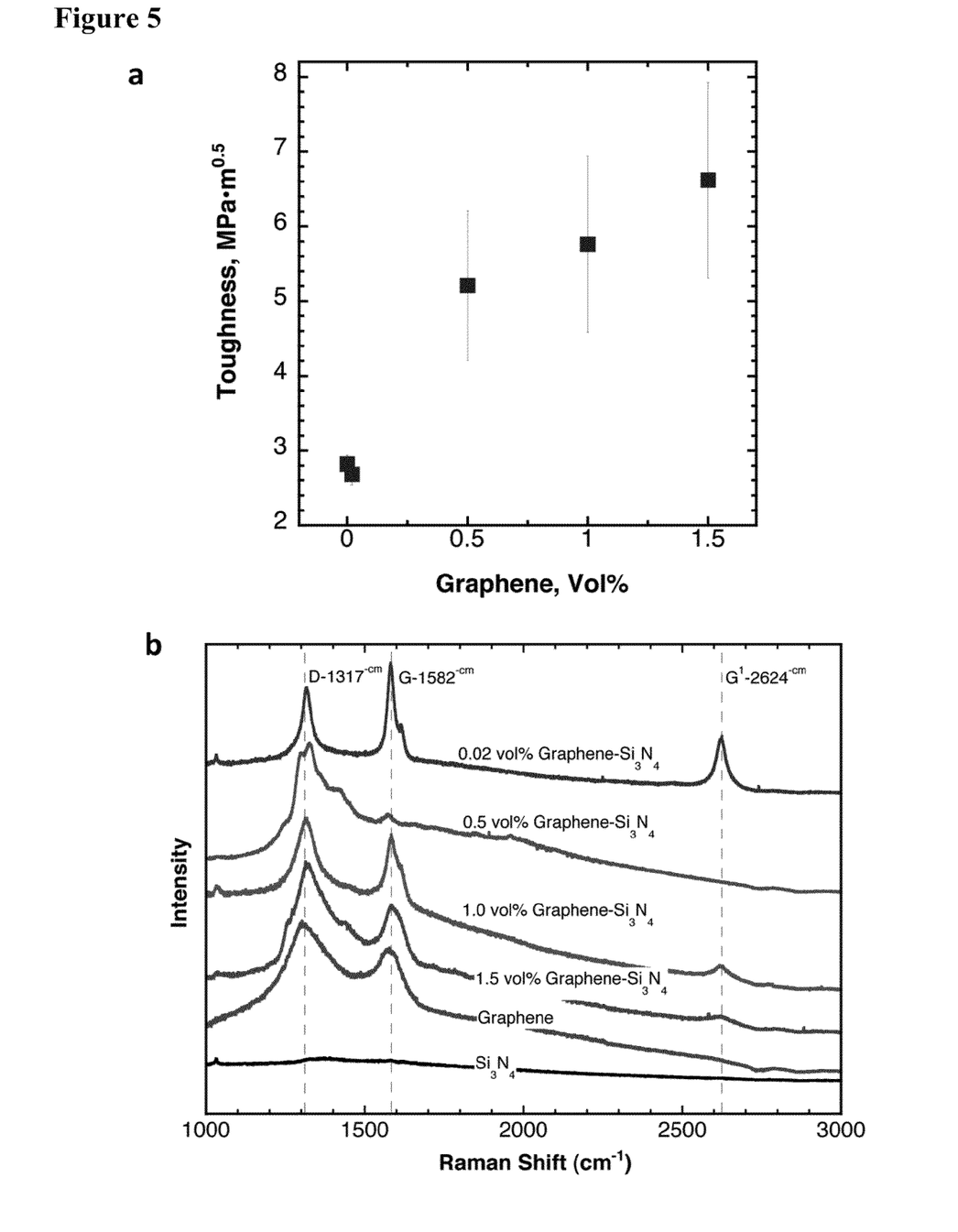
FIG. 5: (a) Toughness of the GPL-Si₃N₄ composite monolith systematically increases with increasing GPL vol %, from 0-1.5-vol % GPL. b) Raman spectroscopy was used to characterize the structure of the GPLs within the Si₃N₄ after SPS high temperature densification (1650° C. for 2-minutes).

FIG. 5a is a plot of the calculated toughness values for the GPL-$Si_3N_4$ nanocomposites, shown as a function of GPL concentration from 0-, 0.02-, 0.5-, 1.0-, and 1.5-vol % GPL. The plot shows a systematic increase in toughness with increasing GPL concentration from, ~2.8 to ~6.6 MPa-m$^{1/2}$. The increase in toughness over the monolith is as high as ~235% (i.e. three-fold increase in toughness for the 1.5-vol % GPL-$Si_3N_4$ nanocomposite over the monolith). The performance of GPL is superior to single-walled carbon nanotube (SWNT) additives at the same filler volume fraction. For example in Ref. 23 we reported fracture toughness of ~4.71 MPam$^{1/2}$ for a 1.0-vol % SWNT-$Si_3N_4$ composite which is significantly lower than the values reported here (~5.8 MPam$^{1/2}$) for GPL. Fractography analysis (FIGS. 3-4) indicates the presence of a variety of toughening mechanisms for GPL including, sheet wrapping, sheet pull-out, two and three dimensional crack deflection, and crack bridging. Table 2

Raman study was also performed to confirm that the sheet-like structures observed in FIGS. 3-4 are GPL. FIG. 5b shows a collection of individual Raman spectra for as-produced graphene, $Si_3N_4$ (after sintering), and 0.02-, 0.5-, 1.0-, and 1.5-vol % GPL-$Si_3N_4$ nanocomposites (after sintering). The as-received graphene shows two clear peaks at ~1317 cm$^{-1}$ (D-band) and ~1582 cm$^{-1}$ (G-band); note that the G' peak at ~2624 cm$^{-1}$ is absent which is typical of multilayer sheets, or platelet configuration of graphene.[37] At ~0.02-vol % of graphene in the ceramic, the Raman signature after SPS indicates a new peak at ~2624 cm$^{-1}$ for the G' (or 2D band). This indicates the thinning of the multilayer graphene platelets into few-layer or possibly bi-layer graphene. Therefore, the high temperatures and pressures associated with SPS can transform the structure of graphene from multilayers into few-layered graphene. However, as we increase the concentration from 0.02- to 1 and 1.5-vol % GPL, the intensity of the G' peak diminishes suggesting that the graphene platelets are no longer being thinned as effectively at the higher loading fractions. Another interesting observation is that the Raman signature for the ~0.5-vol % GPL composite showed no peaks for the G and G' bands. Instead a new peak at ~1332 cm$^{-1}$ appears corresponding to crystalline diamond. Clearly further investigation is warranted to understand the effect of spark plasma sintering (i.e. pulsing direct current while under simultaneous pressure) on the thinning of GPL and the possible conversion of GPL to nanodiamonds.

To summarize, we used aqueous colloidal processing methods to obtain uniform and homogenous dispersions of GPL and $Si_3N_4$ ceramic particles prior to densification using SPS. After densification at ~1650° C. we found direct evidence of graphene in the nanocomposites using Raman spectroscopy. The only exception being ~0.5-vol % of graphene for which case we found that the graphene was possibly converted into the nanodiamond phase. At lower concentrations (0.02-vol % GPL) we converted the GPL into thinner bi-layer or few-layered graphene sheets using SPS. We measured an ~235% increase in toughness for the nanocomposite over the monolith using only 1.5-vol % addition of graphene. The SPS parameters were adjusted to ensure that we maintained the same matrix microstructure phase composition and high density (100% α-$Si_3N_4$ with >99% T.D.) for all samples. Most interestingly, we observed some very unexpected toughening mechanisms on the fracture surfaces of the nanocomposites. The GPL appear to be anchored or wrapped underneath the matrix grains and result in the formation of a continuous wall of graphene along the grain boundaries that arrests and forces cracks to propagate in not in just two- but in three-dimensions in order to continue to propagate through the material. Such fracture behavior in ceramics has hitherto not been reported. Graphene nanofiller reinforcement could potentially be used to enhance toughness for a range of ceramic materials enabling their widespread use in high performance structural applications.

Materials and Methods

Nanocomposite Powder Preparation:

Cetyltrimethylammonium bromide ($C_{16}TAB$) was procured from Sigma-Aldrich Corp., St. Louis, Mo. $Si_3N_4$ powders with mean particle size of ~0.77 μm measured by X-Ray absorption/sedimentation technique and average surface area of ~7.7-$m^2$/g measured by standard BET $N_2$ adsorption was obtained from GS-44, Allied Signal Inc., Torrance, Calif. Appropriate amounts of graphene and $Si_3N_4$ powder were added to separate containers of DI-water with $C_{16}TAB$ pre-dissolved and the pH was adjusted to ~4 using nitric acid. The graphene and $Si_3N_4$ solutions were sonicated for 40 and 20 minutes respectively at 22 watts using a horn sonicator, Misonix S-4000, Qsonica LLC, Newtown, Conn. The dispersed solutions were then combined and sonicated for an additional 10 minutes (22 W) before ball milling for 24 hours using alumina media. After processing the water was evaporated at ~100° C. and the dried nanocomposite slurries were heat treated in argon to remove the surfactant using a heating rate of ~5° C./min up to ~500° C. for one hour hold time.

Graphene Preparation:

Graphite oxide was prepared by oxidizing graphite flakes (average diameter of ~48 μm) in a solution of concentrated sulfuric acid (95-98%), concentrated nitric acid (68%), hydrochloric acid (36-38%) and Potassium chlorate (99.5%) for 96 hours[24-25]. Thermal reduction of graphite oxide into graphene platelets was achieved by placing the graphite oxide powder (200 mg) in a 200 mm inner diameter, 1 m long quartz tube that was sealed at one end. The other end of the quartz tube was closed using a rubber stopper. An argon inlet was then inserted through the rubber stopper. The sample was flushed with argon for ~10 min, and the quartz tube was quickly inserted into a tube furnace (Thermolyne 79300, Thermo Fisher Scientific Inc., USA) preheated to ~1050° C. and held in the furnace for ~35 seconds.

Spark Plasma Sintering (SPS):

The SPS apparatus (SPS 10-3, Thermal Technology, Santa Rosa, Calif., USA) used in this study was operated using a max pulse current of 3000 A and max pulse voltage of 10V. The pulse cycle was 25 ms on and 5 ms off using a heating rate of 100° C./min. An external pressure of 35 MPa was applied from the 5 MPa preload at 20 MPa/min to the warm-up temperature of 600° C. (767 A). The powders were heated inside a graphite die that was lined with graphite foil in order to prevent reactions with the die case. The control temperature was monitored using a single-color optical pyrometer that was focused to within ~6 mm of the powder sample within the die. A secondary temperature measurement was conducted using a Mo sheath type C thermocouple located in the lower punch, ~4 mm, from the bottom of the powder sample. The punch temperature was higher than the die temperature by a measured difference of 100-150° C. at the target densification temperature. A vacuum of at least ~3 Pa was achieved before application of power. After sintering the power is shut off at and pressure held at ~35 MPa for five minutes while the furnace cools naturally at, ≈300° C./min. Density values were measured using the Archimedes method. The rule of mixtures was used to calculate the nanocomposite densities, based on volume fraction, using density values of, ~1.0 and ~3.22 g/$cm^2$, for GPL and $Si_3N_4$, respectively.

REFERENCES

1. Yu, A.; Ramesh, P.; Sun, X.; Bekyarova, E.; Itkis, M. E.; Haddon, R. C. Enhanced Thermal Conductivity in a Hybrid Graphite Nanoplatelet-Carbon Nanotube Filler for Epoxy Composites. *Advanced Materials* 2008, 24, 4740-4744.
2. Lee, C.; Wei, X.; Kysar, J. W.; Hone, J. Measurement of the Elastic Properties and Intrinsic Etrength of Monolayer Graphene. *Science* 2008, 321, 385-388.
3. Wang, X.; Zhi, L.; Müllen, K. Transparent, Conductive Graphene Electrodes for Dye-Sensitized Solar Cells. *Nano Letters* 2008, 8, 323-327.
4. Balandin, A. A.; Ghosh, S.; Bao, W.; Calizo, I. Superior Thermal Conductivity of Single-Layer Graphene. *Nano Letters* 2008, 8, 902-907.
5. Rafiee, M. A.; Lu, W.; Thomas, A. V.; Zandiatashbar, A; Rafiee, J.; Tour, J. M. and Koratkar N. Graphene Nano-Ribbon Composites. *ACS Nano* 2010, 4, 7415-7420.
6. Watcharotone, S.; Dikin, A. D.; Stankovich, S.; Piner, R.; Jung, I.; Dommett, G. H. B.; Evmenenko, G.; Wu, S.; Chen, S.; Liu, C.; Nguyen, S. T.; and Ruoff R. Graphene-Silica Composite Thin Films as Transparent Conductors. *Nano Letters* 2007, 7, 1888-1892.
7. Khan, U.; May, P.; O'Neill, A.; Coleman, J. N. Development of Stiff, Strong, Yet Tough Composites by the Addition of Solvent Exfoliated Graphene to Polyurethane. *Carbon* 2010, 48 [14] 4305-4041.
8. Rafiee, M. A.; Rafiee, J.; Wang, Z.; Song, H.; Yu, Z. Z.; Koratkar, N. Enhanced Mechanical Properties of Nanocomposites at Low Graphene Content. *ACS Nano* 2009, 3, 3884-3890.
9. Rafiee, M. A.; Rafiee, J.; Srivastava, I.; Wang, Z.; Song, H.; Yu, Z. Z.; Koratkar, N. Fracture and Fatigue in Graphene Nanocomposites. *Small* 2010, 6, 179-183.
10. Ramanathan, T.; Abdala, A. A.; Stankovich, S.; Dikin, D. A.; Herrera-Alonso, M.; Piner, R. D.; Adamson, D. H.; Schniepp, H. C.; Chen, X.; Ruoff, R. S. Functionalized Graphene Sheets for Polymer Nanocomposites. *Nature Nanotechnology* 2008, 3, 327-331.
11. Stankovich, S.; Dikin, D. A.; Dommett, G. H. B.; Kohlhaas, K. M.; Zimney, E. J.; Stach, E. A.; Piner, R. D.; Nguyen, S. B. T.; Ruoff, R. S. Graphene-Based Composite Materials. *Nature* 2006, 442, 282-286.
12. Riley, F. L. Silicon Nitride and Related Materials. *Journal of the American Ceramic Society* 2000, 83, 245-265.
13. Hyuga, H.; Jones, M. I.; Hirao, K.; Yamauchi, Y. Fabrication and Mechanical Properties of $Si_3N_4$/Carbon Fiber Composites with Aligned Microstructure Produced by a Seeding and Extrusion Method. *Journal of the American Ceramic Society* 2004, 87, 894-899.
14. Zhan, G. D.; Kuntz, J. D.; Wan, J.; Mukherjee, A. K. Single-Wall Carbon Nanotubes as Attractive Toughening Agents in Alumina-based Nanocomposites. *Nature Materials* 2002, 2 38-42.
15. Zhang, T.; Kumari, L.; Du, G. H.; Li, W. Z.; Wang, Q. W.; Balani, K.; Agarwal, A. Mechanical Properties of Carbon Nanotube-Alumina nanocomposites synthesized by chemical vapor deposition and spark plasma sintering. *Composites Part A* 2009, 40, 86-93.
16. Zhang, P.; Hu, P.; Zhang, X.; Han, J.; Meng, S. Processing and characterization of $ZrB_2$—$SiC_W$ ultra-high temperature ceramics. *Journal of Alloys and Compounds* 2009, 472, 358-362.

17. Zhang, X.; Xu, L.; Du, S.; Han, W.; Han, J. Crack-healing behavior of zirconium diboride composite reinforced with silicon carbide whiskers. *Scripta Materialia* 2008, 59, 1222-1225.
18. Jeong, H.; Lee, Y. P.; Jin, M. H.; Kim, E. S.; Bae, J. J.; Lee, Y. H. Thermal stability of graphite oxide. *Chemical physics letters* 2009, 470, 255-258.
19. Sigmund, W.; Bell, N.; Bergstrom, L. Novel powder-processing methods for advanced ceramics. *Journal of the American Ceramics Society* 2000, 83, 1557-1574.
20. Poyato, R.; Vasiliev, A. L.; Padture, N. P.; Tanaka, H. Aqueous colloidal processing of single-wall carbon nanotubes and their composites with ceramics. *Nanotechnology* 2006, 17, 1770-1777.
21. Sun, J.; Gao, L.; Li, W. Colloidal processing of carbon nanotube/alumina composites. *Chemistry of Materials* 2002, 14, 5169-5172.
22. Blanch, A. J.; Lenehan, C. E.; Quinton, J. S. Optimizing Surfactant Concentrations for Dispersion of Single-Walled Carbon Nanotubes in Aqueous Solution. *The Journal of Physical Chemistry B* 2010, 114, 9805-9811.
23. Corral, E. L.; Cesarano, J.; Shyam, A.; Lara-Curzio, E.; Bell, N.; Stuecker, J.; Perry, N.; Di Prima, M.; Munir, Z.; Garay, J.; Barrera, E. V. Engineered Nanostructures for Multifunctional Single-Walled Carbon Nanotube Reinforced Silicon Nitride Nanocomposites. *Journal of the American Ceramic Society* 2008, 91, 3129-3137.
24. Schniepp, H. C.; Li, J. L.; McAllister, M. J.; Sai, H.; Herrera-Alonso, M.; Adamson, D. H.; Prud'homme, R. K.; Car, R.; Saville, D. A.; Aksay, I. A. Functionalized single graphene sheets derived from splitting graphite oxide. *Journal of Physical Chemistry B* 2006, 110, 8535-8539.
25. Raflee, J.; Rafiee, M. A.; Yu, Z.-Z.; Koratkar, N. Superhydrophobic to superhydrophilic wetting control in graphene films. *Advanced Materials* 2010, 22, 2151-2154.
26. Vadukumpully, S., Paul, J., Valiyaveettil, S. Cationic surfactant mediated exfoliation of graphite into graphene flakes. *Carbon* 2009, 47, 3288-3294.
27. Munir, Z. A., Anselmi-Tamburini, U., Ohyanagi, M. The effect of electric field and pressure on the synthesis and consolidation of materials: A review of the spark plasma sintering method. *Journal of Material Science* 2006, 41, 763-777.
28. Garay J. E. Current-Activated, Pressure-Assisted Densification of Materials. *Annual Reviews Materials Research* 2010, 40, 445-468.
29. Hulberta, D. M., Jianga, D., Dudinaa, D. V., Mukherjee, A. K. The synthesis and consolidation of hard materials by spark plasma sintering. *International Journal of Refractory Metals and Hard Materials* 2009, 27, 367-375.
30. Vasylkiv, O., Borodianskaa, H., Sakkaa, Y. Nanoreactor engineering and SPS densification of multimetal oxide ceramic nanopowders. *Journal of the European Ceramic Society* 2009, 28, 919-927.
31. Casolco, S. R., Xu, J., Garay, J. E. Transparent/translucent polycrystalline nanostructured yttria stabilized zirconia with varying colors. *Scripta Materialia* 2008, 58, 516-519.
32. Zhan G. D., Mukherjee A. K. Carbon nanotube reinforced alumina-based ceramics with novel mechanical, electrical, and thermal properties. *International Journal of Applied Ceramic Technology* 2004, 1, 161-171.
33. Dusza J., Blugan G., Morgiel J., Kuebler J., Inam F., Peijs T., Reece M. J., Puchy V. Hot pressed and spark plasma sintered zirconia/carbon nanofiber composites. *Journal of the European Ceramic Society* 2009, 29, 3177-3184.
34. Estili M., Takagi K., Kawasaki A. Multiwalled carbon nanotubes as a unique agent to fabricate nanostructure-controlled functionally graded alumina ceramics. *Scripta Materialia* 2008, 59, 703-705.
35. Balazsi, C., Shen, Z., Konya, Z., Kasztovszky, Z., Weber, F., Vertesy, Z., Biro, L. P., Kiricsi, I., Arato, P. Processing of carbon nanotube reinforced silicon nitride composites by spark plasma sintering. *Composites Science and Technology* 2005, 65, 727-733.
36. Anstis, G. R., Chantikul, P., Lawn, B. R., Marshall, D. B. A critical evaluation of indentation techniques for measuring fracture toughness: I, direct crack measurements. *Journal of the American Ceramic Society* 1981, 64, 533-538.
37. Dresselhaus, M. S., Jorio A., Hofmann M., Dresselhaus G. Perspectives on Carbon Nanotubes and Graphene Raman Spectroscopy. *Nano Letters* 2010, 10, 751-758.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A ceramic composite material comprising a graphene-reinforced ceramic material wherein the ceramic material comprises a ceramic material selected from the group consisting of $Si_3N_4$, $ZrB_2$, $HfB_2$, $TiB_2$, $NbB_2$, TiC, ZrC, NbC, HfC, TaC, $B_4C$, and $TaB_2$.

2. The ceramic composite material of claim 1, wherein the graphene is present in the graphene-reinforced ceramic material at between about 0.02% to about 1.5% on a volume percentage basis.

3. The ceramic composite material of claim 1, wherein the graphene is present in the graphene-reinforced ceramic material at between about 0.5% to about 1.5% on a volume percentage basis.

4. The ceramic composite material of claim 1, wherein the graphene is present in the ceramic composite material as two or more graphene sheets.

5. The ceramic composite material of claim 1, wherein the graphene is homogenously dispersed throughout the ceramic composite material.

6. The ceramic composite material of claim 1, wherein the graphene comprises graphene that is present at one or more grain boundaries of the ceramic material.

7. The ceramic composite material of claim 6, wherein the graphene present at the one or more grain boundaries comprises one or more graphene sheets.

8. The ceramic composite material of claim 6, wherein the graphene present at the one or more grain boundaries comprises one or more graphene platelets.

9. The ceramic composite material of claim 1, wherein the ceramic material comprises $Si_3N_4$.

10. The ceramic composite material of claim 1, wherein the ceramic material is selected from the group consisting of $NbB_2$, TiC, ZrC, NbC, HfC, TaC, and $B_4C$.

11. The ceramic composite material of claim 1, wherein the ceramic material is selected from the group consisting of $ZrB_2$, $HfB_2$, $TiB_2$, and $TaB_2$.

12. The ceramic composite material of claim 9, comprising graphene present at one or more grain boundaries of the ceramic material.

13. The ceramic composite material of claim 10, comprising graphene present at one or more grain boundaries of the ceramic material.

14. The ceramic composite material of claim 11, comprising graphene present at one or more grain boundaries of the ceramic material.

15. The ceramic composite material of claim 9, wherein the ceramic material further comprises SiC.

16. The ceramic composite material of claim 11, wherein the ceramic material further comprises SiC.

17. The ceramic composite material of claim 1, wherein the ceramic material further comprises SiC.

18. The ceramic composite material of claim 10, wherein the ceramic material further comprises SiC.

* * * * *